United States Patent [19]
Holm Pedersen et al.

[11] Patent Number: 5,097,920
[45] Date of Patent: Mar. 24, 1992

[54] HYDRAULIC STEERING UNIT

[75] Inventors: Poul H. H. Pedersen, Nordborg; Ivar Rasmussen, Sønderborg, both of Denmark

[73] Assignee: Danfoss A/S, Nordborg, Denmark

[21] Appl. No.: 574,883

[22] Filed: Aug. 30, 1990

[30] Foreign Application Priority Data

Sep. 9, 1989 [DE] Fed. Rep. of Germany ....... 3930147

[51] Int. Cl.$^5$ ............................ B62D 5/06; F15B 9/10; F15B 15/20
[52] U.S. Cl. ................. 180/132; 277/212 F; 277/215; 384/607
[58] Field of Search .............. 180/132; 384/607; 277/6, 7, 8, 215, 71, 79, 212 F, 212 R

[56] References Cited
U.S. PATENT DOCUMENTS
4,159,118 6/1979 Jelinek et al. ..................... 277/71

FOREIGN PATENT DOCUMENTS
2098556 11/1982 United Kingdom ................ 180/132

Primary Examiner—Mitchell J. Hill
Attorney, Agent, or Firm—Wayne B. Easton; Clayton R. Johnson

[57] ABSTRACT

Hydraulic steering mechanism is extended through an aperture in an end wall in a housing that has a pressure chamber, the steering mechanism including a slide rotatable with the steering column. An axial bearing is mounted by the end wall for rotatably mounting the steering mechanism while the aperture axially opposite end portion mounts a sealing ring between the housing and the steering mechanism. Axially between the sealing ring and the bearing there is a pressure reduction ring providing an annular gap with the slide for throttling the flow of fluid from the pressure chamber to a fluid collecting chamber that at least in part is defined by the pressure reduction and sealing rings. Fluid can flow from the collecting chamber through a housing outlet. The pressure reduction ring has an enlarged diameter flange for sealingly engaging the end wall and being clamped between the wall and the axial bearing. Increased pressure in the pressure chamber results in the flow of fluid through the gap increasing to automatically increase the pressure drop created by the throttle effect of the pressure reduction ring and thereby keeping the load on the sealing ring small.

9 Claims, 1 Drawing Sheet

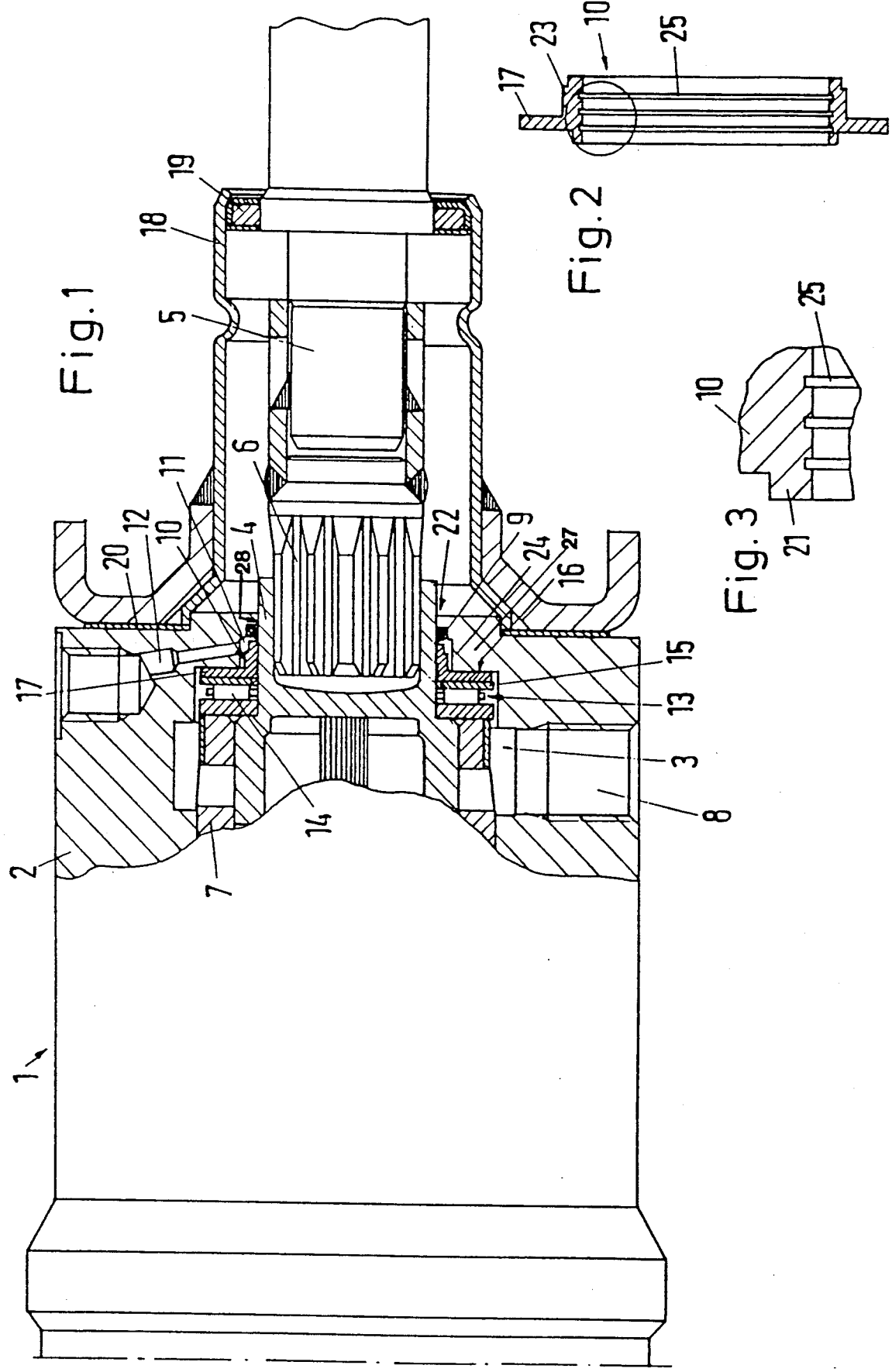

HYDRAULIC STEERING UNIT

BACKGROUND OF THE INVENTION

The invention relates to a hydraulic steering unit comprising a housing having a pressure chamber which has an aperture at one end through which a rotatably mounted steering control apparatus is led to the outside and the aperture is sealed from the outside by a sealing ring.

Such a steering unit is marketed by the applicants under the name "OSP". Such steering units are used in "downstream" operations, i.e. the steering unit is disposed in series between a pump and further downstream hydraulic equipment. In the pressure chamber, there is hydraulic fluid which is under a certain pressure, namely the supply pressure of the downstream hydraulic equipment. By means of the steering control unit, for example a slide connected to a steering column, various control orifices are freed or closed to let the hydraulic fluid reach hydraulic motors which finally turn the wheels. When the pressure in the pressure chamber rises, the sealing ring is more intensely loaded. The friction between the steering control apparatus and the sealing ring is increased. The wear on the sealing ring brought about by movement of the steering control apparatus, i.e. by rotation of the steering column, is increased. In addition, operation of the steering control apparatus is made more difficult by the higher frictional torque.

It is the problem of the present invention to provide a steering unit which is simple to assemble and has a longer life.

This problem is solved in a steering unit of the aforementioned kind in that between the sealing ring and pressure chamber there is a one-piece pressure reduction ring which surrounds the steering control apparatus, that between the pressure reduction ring and sealing ring there is a fluid collecting chamber with an outlet, and that the pressure reduction ring comprises a circumferential flange-like projection which lies sealingly against the end of the pressure chamber.

From U.S. Pat. No. 3,044,785, it is known in an axially movable piston rod to relieve a sealing ring by providing a metal bushing around the piston rod between the pressure chamber and the sealing ring, the hydraulic fluid being able to flow past the bushing. Between the metal bushing and the sealing ring, provision is made for the hydraulic fluid to flow out. The metal bushing is made of relatively many parts. Assembly is difficult. Moreover, the known seal takes up relatively much space.

SUMMARY OF THE INVENTION

According to the invention, the new pressure reduction ring takes up insignificantly more space in the steering control apparatus than the sealing ring that was previously provided there. It is automatically fixed to the end of the pressure chamber under the pressure obtaining in the pressure chamber. The pressure reduction ring is made in one piece so that, in comparison to the sealing arrangement of U.S. Pat. No. 3,044,785, assembly is very considerably simplified. The pressure reduction ring has to be applied to the end of the pressure chamber from the inside. Thereafter, the steering control apparatus can be pushed to the outside through the aperture in the same way as hitherto. The pressure reduction ring has the effect of throttling the pressure on the sealing ring by a throttle effect between itself and the steering control apparatus. If the pressure in the pressure chamber rises, the flow of fluid between the pressure reduction ring and steering control apparatus into the fluid collecting chamber increases. This automatically increases the pressure drop created by the throttle effect of the pressure reduction ring. The load on the sealing ring can therefore be kept small.

Advantageously, the internal diameter of the pressure reduction ring is conically increased over part of its length at the end adjacent to the pressure chamber whereas it remains constant over the rest of its length. The fluid collecting chamber surrounds the pressure reduction ring up to near the flange-like projection. The pressure reduction ring is thus for the most part of its length subjected to the pressure in the fluid collecting chamber from the outside. If the pressure in the fluid collecting chamber rises, the pressure reduction ring is compressed radially inwardly, whereby the throttling effect in the annular gap between the pressure reduction ring and the steering control apparatus increases. This increases the pressure drop across the pressure reduction ring, whereby the pressure in the fluid collecting chamber drops again. By increasing the internal diameter of the pressure reduction ring at the end adjacent to the pressure chamber, an effect can be compensated that arises from the internal diameter of the pressure reduction ring becoming slightly smaller at very high pressures. The conical construction of the internal diameter over part of its length prevents contact between the pressure reduction ring and the steering control apparatus upon a reduction in the internal diameter.

The conical internal diameter enlargement has a gradient in the order of 1:100. By way of example, the internal diameter is increased by 20 $\mu$m over a length of 2 mm.

In a preferred embodiment, the steering control apparatus is supported at the end of the pressure chamber by an axial bearing, the projection of the pressure reduction ring being clamped between the end and the axial bearing. This has the advantage that the pressure reduction ring is additionally fixed to the end of the pressure chamber. This ensures that even a larger pressure in the pressure chamber is unable to push the pressure reduction ring further into the aperture and thereby increase the friction between the steering control apparatus and the pressure reduction ring. Instead, the additional fixing of the pressure reduction ring to the end of the pressure chamber permits the throttle gap between the pressure reduction ring and steering control apparatus to be kept substantially constant.

Advantageously, the axial bearing is in the form of a roller bearing, a roller plate of stiff material being provided between the pressure reduction ring and the roller elements of the bearing. Upon movement of the steering control apparatus relatively to the housing, one thereby avoids friction between the steering control apparatus and the flange-like projection of the pressure reduction ring. Despite the individual roller elements, the roller plate of stiff material permits a uniform pressure distribution on to the flange-like projection of the pressure reduction ring.

Preferably, centering means for the axial bearing are provided on the side of the pressure reduction ring facing the axial bearing. These centering means ensure that the pressure reduction ring is centrally disposed in the axial bearing. Since the pressure reduction ring is substantially central in the aperture of the housing, this automatically achieves relatively good centering of the axial bearing in relation to the aperture.

The centering means are preferably formed by a circumferential centering projection. This prevents direct contact between the axial bearing and the steering control apparatus, which reduced friction.

In a preferred embodiment, at least one circumferential groove is provided in the radial inner surface of the pressure reduction ring. The groove reduces the effective area over which the pressure reduction ring is in contact with the steering control apparatus. This further reduced friction. In addition, the groove ensures that the pressure reduction ring centres itself on the occurrence of fluid flow from the pressure chamber to the fluid collecting chamber.

It is particularly advantageous for the groove to have the shape of a square groove in cross-section. Grooves of this kind are easy to produce and bring about a favorite flow behaviour.

A preferred example of the invention will now be described in relation to the drawing, wherein:

BRIEF DESCRIPTION OF THE DRAWING

FIG. 1 illustrates a steering control unit,

FIG. 2 is a cross-section through a pressure reduction ring, and

FIG. 3 is an enlarged fragment of FIG. 2.

DESCRIPTION OF THE PREFERRED EMBODIMENT

A steering unit 1 comprises a housing 2 with a pressure chamber 3. The housing has an end wall 27 that defined an end 16 of the pressure chamber, there being provided a bore 28 in the housing end wall that includes an aperture 22 through which an inner slide 4 of steering control apparatus is already led to the outside. The inner slide 4 is connected to a steering column 5 by way of a spline connection 6. By rotating the steering column 5, the inner slide 4 is likewise turned. The inner slide 4 co-operates with an outer slide 7 in known manner to control hydraulic motors (not shown).

The pressure chamber 3 communicates by way of a connector 8 with downstream hydraulic equipment or with a tank. Hydraulic fluid can flow out of the pressure chamber 3 through the connector 8. The aperture 22 is sealed from the outside with the aid of a sealing ring 9 which concentrically surrounds the inner slide 4 and is disposed in the housing 2 in the bore 28.

Between the sealing ring 9 and the pressure chamber 3 there is a pressure reduction ring 10. The pressure reduction ring 10 comprises a flange-like projection 17 which sealingly lies against the end 16 of the pressure chamber 3. The flange-like projection 17 extends radially outwardly from a member (annular ring part) 23. The member 23 is inserted in a bore portion 24 of the bore 28 in the housing 2 that is radially larger than the aperture 22. Between the pressure reduction ring 10 and the sealing ring 9 there is a fluid collecting chamber 11 from which the fluid can flow through an outlet 12. The bore portion 24 has a larger internal diameter than the external diameter of the member 23 of the pressure reduction ring 10. The fluid collecting chamber 11 bounded by the bore portion 24 and the pressure reduction ring 10 thus surrounds the member 23 of the pressure reduction ring practically up to the flange-like projection (circumferential flange) 17. The seal between the pressure chamber 3 and the fluid collecting chamber 11 is brought about by the contact between the flange-like projection 17 and the end 16 of the pressure chamber 3. The member 23 of the pressure reduction ring 10 is thus subjected on the outside to the pressure in the fluid collecting chamber 11. If the pressure in the fluid collecting chamber 11 rises, the pressure reduction ring 10 is compressed towards the inner slide 4, i.e. radially inwardly, whereby the annular gap between the inner slide 4 and the pressure reduction 10 is reduced. This increases the throttling effect of this annular gap. The pressure drop between the pressure chamber 3 and the fluid collecting chamber 11 is increased. This reduces the pressure in the fluid collecting chamber 11 again and the sealing ring 9 is loaded correspondingly more weakly.

The steering control unit formed by the inner slide 4, steering column 5 and outer slide 7 is axially mounted at the end 16 of the pressure chamber 3 by way of an axial bearing 13. The axial bearing 13 comprises roller elements 14 which can roll on a roller plate 15. The roller plate 15 presses the flange-like projection 17 of the pressure reduction ring 10 against the end 16 of the pressure chamber 3. In this way, the pressure reduction ring 10 is securely held in its intended position. At its side adjacent to the axial bearing 13, the pressure reduction ring 10 has a central projection (central annular projection or annular ring part) 21 which engages in a complementary central bore of the roller plate 15. The central projection 21 is in the form of a circumferential projection, i.e. it makes practically overall circumferential contact with the roller plate 15. This brings about a uniform force distribution on the pressure reduction ring 10. At the same time, this ensures that the axial bearing 13 is centered in relation to the pressure reduction ring 10. Moreover, the centering projection prevents contact between the roller plate 15 and the inner slide 4, whereby wear is reduced.

The pressure reduction ring 10 comprises grooves 25 which, in cross-section, have the shape of a square groove. The grooves 25 are pressure compensating grooves which, together with fluid flow between the inner slide 4 and pressure reduction ring 10, ensure that the pressure reduction ring 10 centres itself. This takes small tolerances into account that might occur in the manufacture of the pressure reduction ring 10. On the other hand, the grooves 25 reduce the effective area over which the pressure reduction ring 10 can lie on the inner slide 4 if it is not yet centred because of an excessively low fluid flow. In this case, friction is reduced and operation of the steering unit 1 is made easier.

The internal diameter of the pressure reduction ring 10 is not constant. At its end adjacent to the pressure chamber, the internal diameter is conically enlarged over part of its length. This increase in diameter is, for example, in the order of $\mu$m. By way of example, the internal diameter is increased by 20 $\mu$m over a length of 2 mm. The gradient of the conical internal diameter enlargement is therefore in the order of 1:100. These features ensure that the reduction in internal diameter of the pressure reduction ring 10 that necessarily occurs when there is a high pressure in the pressure chamber 3 will not lead to contact and thus high friction between the pressure reduction ring 10 and the inner slide 4.

A steering column holder 18 is connected to the housing 2 and supports the steering column by way of a steering column bearing 19. A dust seal 20 is provided between the housing 2 and the steering column holder 18.

During operation, the hydraulic fluid under pressure in the pressure chamber 3 inevitably seeks to penetrate to the outside through the aperture 22 along the inner slide 4. It flows past the pressure reduction ring 10. The small gap between the pressure reduction ring 10 and the inner slide 4 constitutes a throttle which brings about a considerable pressure drop in the fluid. The fluid collects in the fluid collecting chamber 11 and flows off through the outlet 12. The pressure that can then still act on the sealing ring 9 is practically negligible.

We claim:

1. A hydraulic steering unit comprising a housing having an end wall, a pressure chamber and a bore opening through the end wall to the pressure chamber, an axially extending steering control mechanism rotatably mounted by the housing and extending axially through the bore into the pressure chamber, a sealing ring in the bore for forming a fluid seal between the steering mechanism and the housing, a one piece pressure reduction ring surrounding the steering mechanism and at least in part being located axially between the pressure chamber and the sealing ring to provide a small annular gap between the pressure reducing ring and the steering mechanism that constitutes a throttle, and an annular fluid collecting chamber at least in part defined by the pressure reduction ring and the sealing ring and extending axially between the pressure reduction ring and the sealing ring, the pressure reduction ring having a part surrounded by the fluid collecting chamber, the housing having a fluid outlet opening to the fluid collecting chamber, the pressure reduction ring having a circumferential flange sealingly abutting against the end wall.

2. A steering unit according to claim 1, characterized in that the pressure reduction ring has an inner circumferential surface and at least one circumferential groove opening through the inner surface to the steering mechanism, the steering mechanism and the reduction ring providing an annular throttle axially between the collecting chamber and the pressure chamber.

3. A steering unit according to claim 2, characterized in that the groove is rectangular in cross section.

4. A hydraulic steering unit comprising a housing having an end wall, a pressure chamber and a bore opening through the end wall to the pressure chamber, an axially extending steering control mechanism rotatably mounted by the housing and extending axially through the bore into the pressure chamber, a sealing ring in the bore for forming a fluid seal between the steering mechanism and the housing, a one piece pressure reduction ring surrounding the steering mechanism and at least in part being located between the pressure chamber and the sealing ring, and a fluid collecting chamber that in part is defined by the pressure reduction ring and the sealing ring, the housing having an outlet opening to the fluid collecting chamber, the pressure reduction ring having a circumferential flange sealingly abutting against the end wall, the pressure reduction ring having an axially extending annular ring part extending axially between the circumferential flange and the sealing ring and being of an outer diameter substantially smaller than the outer diameter of the circumferential flange, and a central annular projection projecting axially away from the circumferential flange in a direction axially opposite the annular ring part, the central annular projection being of an outer diameter substantially smaller than the outer diameter of the circumferential flange.

5. A hydraulic steering unit comprising a housing having an end wall, a pressure chamber and a bore opening through the end wall to the pressure chamber, an axially extending steering control mechanism rotatably mounted by the housing and extending axially through the bore into the pressure chamber, a sealing ring in the bore for forming a fluid seal between the steering control mechanism and the housing, a one piece pressure reduction ring surrounding the steering control mechanism and at least in part being located between the pressure chamber and the sealing ring, and a fluid collecting chamber that in part is defined by the pressure reduction ring and the sealing ring, the housing having an outlet opening to the fluid collecting chamber, the pressure reduction ring having a circumferential flange sealingly abutting against the end wall, the pressure reduction ring having an annular part that has a first end opening to the pressure chamber and an annular part that has an end opening to the fluid collecting chamber, the annular ring part that opens to the pressure chamber having an inner circumferential surface that in an axial direction throughout its length is conical, and the annular ring part that opens to the fluid collecting chamber having an inner circumferential surface that is of a constant internal diameter throughout its axial length.

6. A steering unit according to claim 5 characterized in that the circumferential inner surface of the annular ring part that opens to the pressure chamber has a conical internal diameter enlargement of a gradient in the order of about 1,100.

7. A hydraulic steering unit comprising a housing having an end wall, a pressure chamber and an bore opening through the end wall to the pressure chamber, an axially extending steering control mechanism rotatably mounted by the housing and extending axially through the bore into the pressure chamber, a sealing ring in the bore for forming a fluid seal between the steering mechanism and the housing, a one piece pressure reduction ring surrounding the steering control mechanism and at least in part being located between the pressure chamber and the sealing ring, and a fluid collecting chamber that in part is defined by the pressure reduction ring and the sealing ring, the housing having an outlet opening to the fluid collecting chamber, the pressure reduction ring having a circumferential flange sealingly abutting against the end wall, and an axial bearing in the housing adjacent to the end wall for supporting the steering mechanism, the circumferential flange being clamped between the end wall and the axial bearing.

8. A steering unit according to claim 7, characterized in that the axial bearing comprises a roller element and a roller plate of stiff material between the pressure reduction ring and the roller element.

9. A steering unit according to claim 8, characterized in that the pressure reduction ring has centering means for ensuring the axial bearing is centered relative to the projection ring.

* * * * *